T. C. PROUTY.
DRIVING MECHANISM.
APPLICATION FILED MAR. 28, 1914.

1,260,447

Patented Mar. 26, 1918.
2 SHEETS—SHEET 1.

T. C. PROUTY.
DRIVING MECHANISM.
APPLICATION FILED MAR. 28, 1914.

1,260,447.

Patented Mar. 26, 1918.
2 SHEETS—SHEET 2.

Witnesses:
C. Burnap
Henry A. Parks

Inventor:
Theodore C. Prouty
By Sheridan, Wilkinson & Scott
Att'ys

UNITED STATES PATENT OFFICE.

THEODORE C. PROUTY, OF AURORA, ILLINOIS, ASSIGNOR, BY MESNE ASSIGNMENTS, TO THE VAN SICKLEN COMPANY, A CORPORATION OF ILLINOIS.

DRIVING MECHANISM.

1,260,447.  Specification of Letters Patent.  Patented Mar. 26, 1918.

Application filed March 28, 1914. Serial No. 827,910.

*To all whom it may concern:—*

Be it known that I, THEODORE C. PROUTY, a citizen of the United States, residing at Aurora, in the county of Kane and State of Illinois, have invented certain new and useful Improvements in Driving Mechanism, of which the following is a specification.

This invention relates to improvements in driving mechanism, and has for its object to provide a new and improved form of mechanism especially adapted for driving speedometers and the like. Hitherto in connection with such devices the driving mechanism has consisted of gears and pinions secured to a rotating wheel of a vehicle and flexible shaft and has been utilized to transmit rotations to the indicating mechanism.

In my invention I provide an improved form of mechanism comprising an actuating member adapted to be attached to the drive shaft of a vehicle and provided with means engaging a gear which in turn is carried upon a shaft adapted to operate a flexible shaft.

Another feature of my invention is the location of this actuatable member and gear in the transmission casing of the vehicle where it is protected from dust, dirt, water and the like, and owing to the presence of the oil and grease therein is constantly lubricated.

My invention further contemplates the use and arrangement of a new form of actuatable member adapted and arranged to coact with a gear, as will be further described below.

Still another object of my invention is to provide in combination with transmission and clutch mechanism, a new and improved form of actuatable member and speedometer driving mechanism.

These and other objects will be set forth and explained in the following specification and accompanying drawings, in which.

Figure 1:
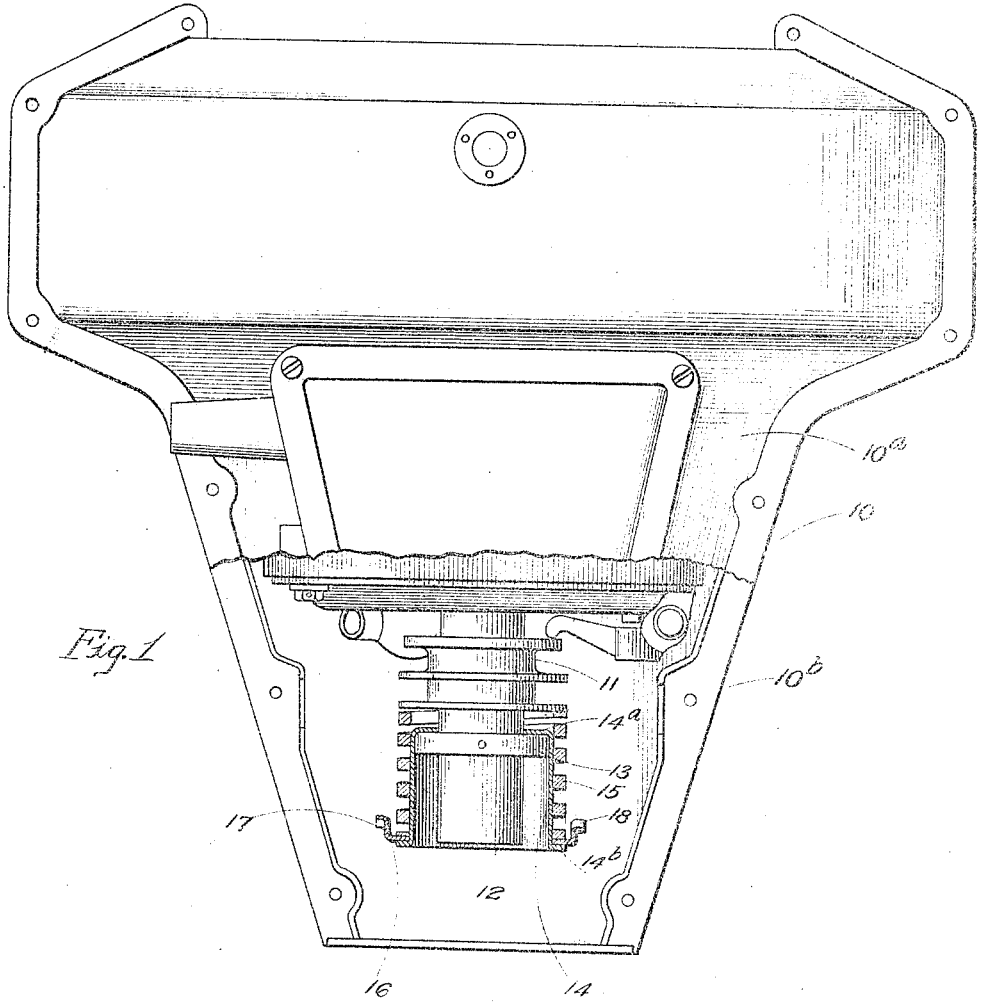
Figure 1 is a plan view of the transmission casing, part of which is broken away to show my actuatable member in place.

Like numerals refer to like elements throughout the drawings, in which 10 designates generally the transmission casing having top portion 10ª and lower portion 10ᵇ adapted to be secured together by bolts or the like. Located in this transmission casing is the driving mechanism of a vehicle which need not be described at length, as it is well known to those familiar with the art. This driving mechanism comprises, among other elements, the sliding collar 11, slidably mounted upon the driving shaft 12 of a vehicle. A collar 13 is fixed to the driving shaft 12 to rotate therewith, and mounted upon this collar is an inturned flange 14ª and spring sleeve 14. Adjacent its other portion this sleeve is formed with the outwardly extending flange 14ᵇ, and a clutch spring 15 extends between the rear face of collar 11 and the flange 14ᵇ, this spring being coiled around the sleeve 14, as clearly shown in Fig. 1.

The general operation of the mechanism is well known and it need only be mentioned that when the collar 11 is moved rearwardly on the driving shaft 12, the latter is not driven by the engine shaft and when the collar 11 is released, the spring 15 will actuate the same to operate suitable clutch mechanism to operatively connect the driving shaft 12 to the engine shaft to rotate therewith. The spring sleeve 14 is adapted to rotate with the driving shaft 12, and consequently with the rear wheels of a vehicle so that by arranging my speedometer driving mechanism to coact with this driving shaft 12, rotations of the rear wheels may be suitably indicated, either as to speed or number, or both as desired. For this purpose, in the embodiment of my invention shown in Fig. 1, I provide what I term an actuatable member 16, interposed between the spring 15 and the flange 14ᵇ to rotate with the latter. This actuatable member 16 comprises in effect a shell and is formed with the angularly disposed flange 17 from which project the segments 18 comprising, in effect, teeth. These teeth are arranged successively about the periphery of the flange 17 and extend from one edge thereof toward the other and lie substantially in planes inclined with respect to the axis of rotation of the member. The rear edge of each of the teeth 18 is spaced from the front edge of the adjacent tooth a distance which constitutes the pitch of the segments 18. Projecting through the casing 10ª is the sleeve 19 having a flange 19ª adapted to be secured to the casing in any suitable manner. Rotatably mounted in the sleeve 19 is the shaft 20 provided with the bushing 21 at one end thereof, secured thereto by the pin 22. This bushing carries a gear 23 located outwardly of the sleeve 19, as clearly shown in Fig. 2. At the other end of the sleeve 19 is provided the bushing 23, there being a space in the sleeve 19 between the bushings 21 and 23. At the end of the shaft 20 opposite to that at which is located gear 23, is provided a male engaging member 20ª adapted to coact with the female or socket member of a flexible shaft, not shown, these male and female members being held in engagement by the flanged collar 24, in a well known manner.

Figure 2:
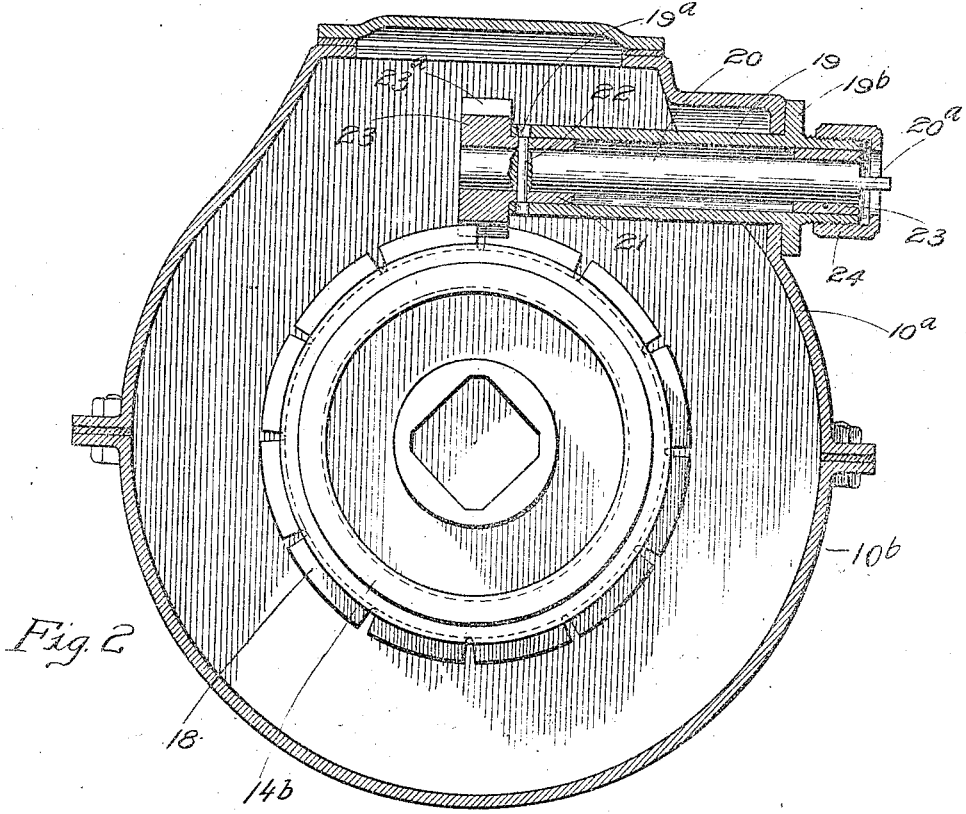
Fig. 2 is a transverse section through the casing showing the driving mechanism for a speedometer.
Figure 3:
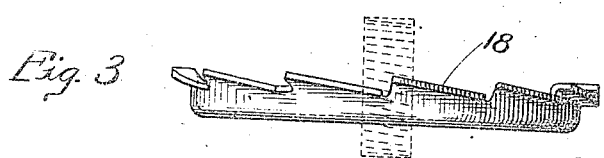
Fig. 3 is a plan view of my improved actuatable member, the driven gear being shown in dotted lines.

The sleeve 19 is provided with the apertures 19ᵇ therein, preferably located in position to aline with the pin 22 when it is desired to remove the same by driving it out and also providing access for lubricant from the casing into sleeve 19. The sleeve 19 extends inwardly of the casing 10, as shown in Fig. 2, to position wherein the gear 23 will mesh with tooth segments 18 of the actuating member, as illustrated in Fig. 3, for example. The teeth 23ª of gear 23 are inclined similarly to the tooth segments 18 and are in mesh therewith, as shown in Fig. 2. It will be apparent that the teeth 23ª being constructed of a suitable pitch and meshing, as stated, with the segments 18, when actuating member 16 is rotated with the driving shaft 12, the coaction of the successive segments 18 with teeth 23ª will operate to rotate the gear 23 and consequently the shaft 20.

Figure 4:
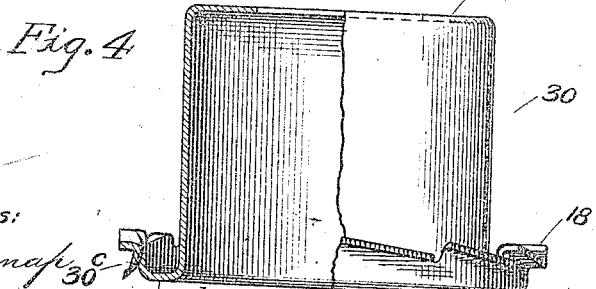
Fig. 4 is a plan view partially in section of a modified form showing the driving member formed integral with the clutch spring sleeve.

In Fig. 4 I have shown an actuatable member 30, in which the actuatable member 16 is formed integral with the clutch spring sleeve 14 in effect, this member 30 being provided at one end with the inturned flange 30ª and at its other end with the outwardly extending flange 30ᵇ from which extends rearwardly the portion 30ᶜ in turn carrying the outwardly extending tooth segments 18′.

It is obvious that my invention is susceptible of many modifications and changes, and I do not wish to be restricted to the showing or description beyond the scope of the appended claims.

What I claim is:—

1. An actuating member comprising a flanged disk, a plurality of segments projecting from said flange and arranged successively therearound, said segments being inclined with respect to planes through the axis of rotation of said member.

2. An article of manufacture comprising a gear having a flange formed thereon, said flange being formed into a plurality of segments inclined with respect to planes through the axis of said gear.

3. In combination with a rotatable shaft, a member secured thereto to rotate therewith, said member having a peripheral flange and a plurality of segments formed on said flanges, a toothed member arranged to coact with said flanged member in such wise that the rotation of the latter by means of the engagement of said segments thereof with the teeth of said toothed member will operate to rotate the latter, a shaft secured to said gear to rotate therewith, and a sleeve surrounding said shaft.

4. In combination with a driving shaft, an actuatable sleeve located therearound to rotate therewith, said sleeve being provided with a reversely bent portion at one extremity, and outwardly projecting teeth formed upon said reversely bent portion, said teeth being adapted to coact with a gear to rotate the same.

5. In combination, a driving shaft, a sleeve mounted thereon, an actuating member located around and arranged to rotate with said shaft, a spring located around said sleeve, and pressing against said actuatable member, the latter being provided with a seat for one end of said spring and being formed with means to engage a gear.

6. In combination, a drive shaft, a collar secured to said shaft, a sleeve slidably mounted on said shaft, an actuating member located around said shaft and having a flange engaging said collar, said member being provided with a seat adjacent one extremity, a spring located around said sleeve having one end seated in said seat, said member being provided with outwardly extending tooth portions adapted to engage and rotate a gear.

In testimony whereof, I have subscribed my name.

THEODORE C. PROUTY.

Witnesses:
HENRY A. PARKS,
HELEN D. FREUND.